United States Patent [19]
Zeiss

[11] Patent Number: 4,768,204
[45] Date of Patent: Aug. 30, 1988

[54] METHOD AND APPARATUS FOR TRANSMITTING SIGNALS BETWEEN A MASTER STATION AND A NUMBER OF TERMINALS

[75] Inventor: Willi Zeiss, Kandel, Fed. Rep. of Germany

[73] Assignee: Siemens Aktiengesellschaft, Berlin and Munich, Fed. Rep. of Germany

[21] Appl. No.: 761,362

[22] Filed: Aug. 1, 1985

[30] Foreign Application Priority Data

Aug. 3, 1984 [DE] Fed. Rep. of Germany ....... 3428766

[51] Int. Cl.⁴ ............................................. H04B 3/04
[52] U.S. Cl. ...................................... 375/12; 375/98; 455/70; 455/232
[58] Field of Search ...................... 455/67, 68, 70, 232, 455/234; 375/12, 13, 14, 98; 340/825.06, 825.15; 371/33; 370/85

[56] References Cited

U.S. PATENT DOCUMENTS 3,566,271  2/1971  Whang et al. .................... 375/12
4,222,118  9/1980  Dickinson et al. ................ 455/70
4,489,416 12/1984  Stuart ............................... 375/13

FOREIGN PATENT DOCUMENTS 0102225  7/1984  European Pat. Off. .
0113231 11/1984  European Pat. Off. .

OTHER PUBLICATIONS

C. Lemos et al., "Adaptive Entzerrung von Digitalen Signalen Hoher Datenrate", Electronik, vol. 25, 12/16/83, pp. 56-62.
"Optical Transmitter of Information", Patent Abstracts of Japan, vol. 7, No. 4 (E-151) (1149), Jan. 1983.

Primary Examiner—Benedict V. Safourek
Attorney, Agent, or Firm—Kenyon & Kenyon

[57] ABSTRACT

The invention relates to a method and apparatus for transmitting data signals between a master station and a plurality of terminal stations connected at different points of a transmission line, in which a correction of the attenuation distortion caused by the transmission line is carried out in the receiving station. The method transmits a plurality of signals prior to the start of a regular transmission which is used by the receiving station to determine the appropriate gain it requires to compensate for the attenuation of the specific section of the transmission line to be used in the regular transmission. The gains are set in the receiving amplifiers of the receiving stations and stored in associated memory modules.

9 Claims, 2 Drawing Sheets

METHOD AND APPARATUS FOR TRANSMITTING SIGNALS BETWEEN A MASTER STATION AND A NUMBER OF TERMINALS

TECHNICAL FIELD

The invention relates, generally, to a method and apparatus for transmitting signals between a master station and a number of terminal stations connected at different points of a transmission line. In particular, the invention carries out a correction of the attenuation distortion caused by the transmission line during data transmission.

BACKGROUND OF THE INVENTION

It is already known to carry out corrections of signals distortions, caused by a transmission line, in a data transmission with square wave signals between terminal stations and a master station. The publication, Elektronik, No. 25, 1983, pages 56 to 62, describes an adaptive distortion correction network having a filter characteristic which automatically adapts to the distortions, caused by the transmission line, of heavy harmonic-containing square wave signals. The distortion correction network described therein is formed by an orthogonal filter of relatively elaborate design, the aforementioned filter characteristic being set on the basis of a signal evaluation of the distorted signal, and a control unit connected thereto.

One disadvantage of such a correction network is that control of the input signal level to a defined value is provided only to a limited extent; only short-time fluctuations in the amplitude of the signal are equalized. Secondly, to carry out the control process, the presence of a signal is always necessary and the control process always takes a certain amount of time. Lastly, the correction network does not provide a constant compensation of the signal level attenuation fixed over an extended period of time.

It is therefore an object of the invention to ensure in a simple manner that in a signal transmission over different distances a constant level of the received signal can always be made available for evaluation.

SUMMARY OF THE INVENTION

The foregoing problems are obviated by the invention which is a method of transmitting signals between a master station and a plurality of terminal stations connected at different points of a transmission line, in which a correction of the attenuation distortion caused by the transmission line is carried out in the receiving station, comprising the steps of:

(a) transmitting a plurality of signals via the transmission line, prior to the start of a desired transmission, for determining the respective gains of receiving amplifiers present in the master station and in each of the terminal stations; and (b) storing and then setting the gains of the receiving amplifiers in the terminal stations and in the master station in such a manner that the signal level attenuation of the section of the transmission line in use between the master station and each respective terminal station is compensated and the respective signal therebetween is set at a defined level.

The method is especially advantageous in data transmission over telecommunication lines where the signal waveforms used are formed avoiding heavy harmonic components and are in the frequency range of less than one MHz. In such case, agreement of the transmitting and receiving signal can be brought about by frequency—dependent amplification of the receiving station. An extremely simple and fast setting of a desired signal level can be achieved by transmitting to the receiving station, prior to the start of the signal transmission proper, information as to what signal level attenuation appears on the section of the transmission line in use. This information can be, for instance, part of a data message to be transmitted which may be formed in accordance with the standards for data packet transmission as per CCITT-X.25. Any detrimental effect of control time-constants in setting the signal level does not occur.

According to another aspect of the invention, information regarding the specific signal level attenuation values can be obtained in a simple manner by a signal level measurement carried out separately for every possible connection. Advantageously, the invention also makes possible the determination of the attenuation values by determining the required gains of the terminal stations in a learning phase via a step-by-step increase of the gain in each of the terminals without additional measuring devices. In this learning phase, the determination of the required gains in the master station can also be carried out by repeatedly attempting to establish a connection from the master station to each of the terminal stations, for instance, on the basis of an HDLC (high level data link control) master transmission procedure. Additionally, the security in the transmission and evaluation of the signal in the receiving station can be increased in an advantageous manner by taking into consideration the signal-to-noise ratio.

The method according to the invention can be carried out with apparatus which deposits the gain values, which have been determined in the learning phase, in a memory module connected to each of the receiving amplifiers so that the gain values are always ready to called up for any connection to be established.

BRIEF DESCRIPTION OF THE DRAWINGS

For a better understanding of the invention, reference is made to the following description of an exemplary embodiment thereof and to the accompanying drawings therein.

DETAILED DESCRIPTION

Figure 1:
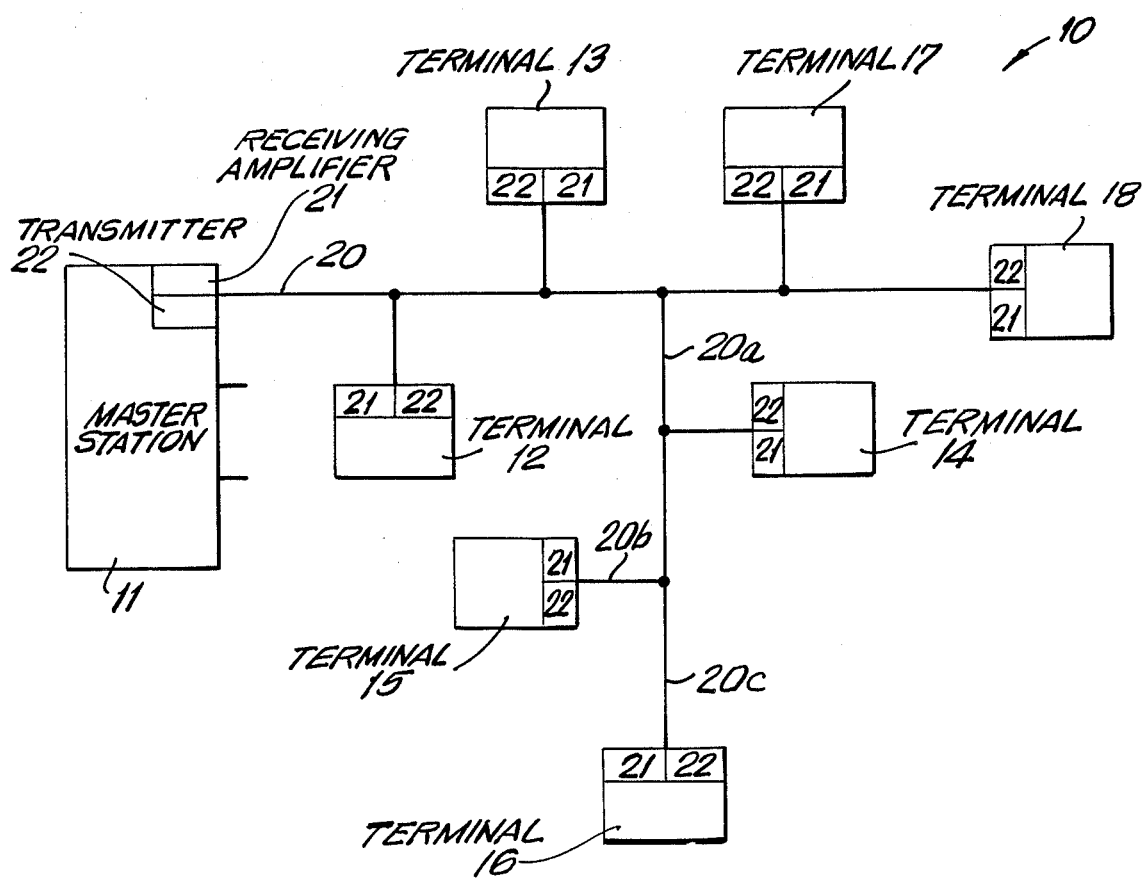
FIG. 1 is a block diagram of an exemplary embodiment of an apparatus for transmitting information between a master station and a plurality of terminal stations.

FIG. 1 shows an apparatus 10 for transmitting information between a master station 11 and a plurality of terminal stations 12 . . . 18, connected thereto via a transmission line 20 such as a telecommunication line. Note that FIG. 1 also shows part of the transmission line 20 having spur lines 20a, 20b, 20c which lead to the terminals 14, 15, 16, respectively. The master station 11 and each of the terminals 12 . . . 18 exhibit a receiving amplifier 21 and a transmitter 22 at their interfaces to the transmission line 20. Data signals can be transmitted properly only if the receiving amplifier 21 of each receiving station has the necessary gain required to overcome the attenuation distortion caused by the particular section of the transmission line 20 used in the transmission. The information to be transmitted is present, for instance, via a certain selected code (NRZI) in the flanks of a transmitted signal and is converted into pulses with a harmonic content as low as possible (for instance, bell-shaped pulses with a $\cos^2$ waveform).

Figure 2:
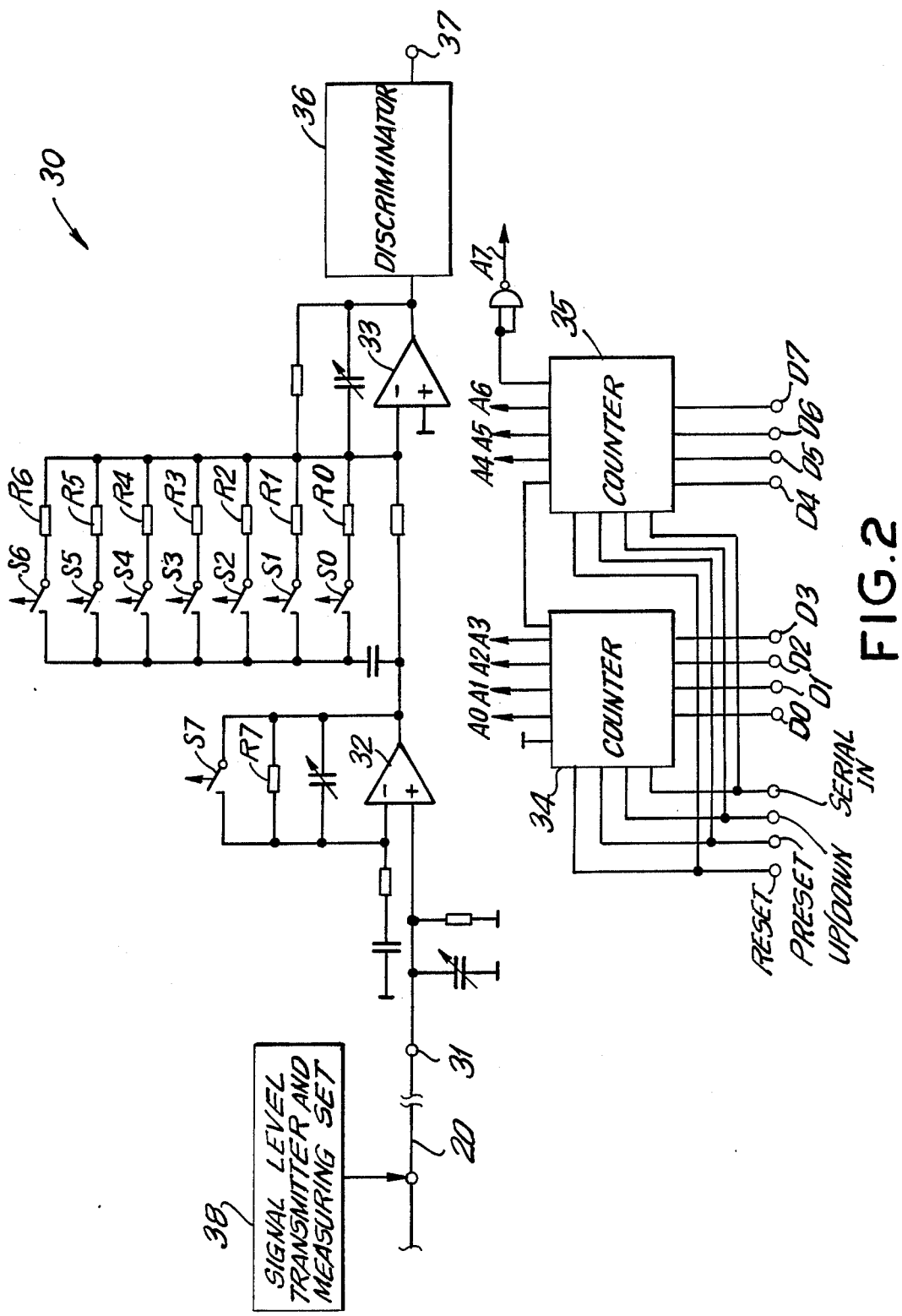
FIG. 2 is an electrical circuit diagram of an adaptive receiving amplifier within each of the terminal stations and the master station of FIG. 1.

In the receiving amplifier 30 depicted in FIG. 2, a transmitted signal arrives from the transmission line 20 at an input 31 and is amplified in a first amplifier module 32. The first amplifier module 32 is followed by a second amplifier module 33, the gain of which can be adjusted by a network of series-connected resistors R0 . . . R6 and switches S0 . . . S6, for instance, from 0 to 20 dB, in seven steps and their combination. The gain of the first amplifier module 32 can be varied via a switch S7 which shorts a resistor R7, for instance, between 0 dB (switch S7 closed) and 20 dB (switch S7 open). Overall, a gain adjustment, via the first and second amplifier modules 32, 33, is thus possible in the receiving amplifier 30 in the range of approximately 0-40 dB in 256 steps. Note that each module has associated coupling capacitor-resistor arrangements at its input and in its feedback circuitry.

The switches S0 . . . S7 of the modules 32, 33 are controlled by first and second counters (storage modules) 34, 35 which receive at control inputs D0 . . . D3 and D4 . . . D7, respectively, digital data from a control unit (not shown) of the particular station for the specific gain values which may, for instance, be part of the data messages or are fed in separately. In addition to the inputs RESET, PRESET, UP/DOWN, and SERIAL IN which are necessary for the operation of the counters, (also from the control unit) the first and second counters 34, 35 have control outputs A0 . . . A3 and A4 . . . A7, respectively, which drive the corresponding module switches S0 . . . S7. The receiving amplifier gain necessary for the specific transmission values of the section of the transmission line 20 in use can be loaded serially or in parallel from the control unit into the counters 34, 35, by which the switches S0 . . . S7 are then driven. Parallel loading will be used if a microprocessor bus is available as the transmission line 20 and a fast change of the gain is frequently required, for example, in the master station 11 of a multi-point connection. The serial variant will normally be used in the terminals 12 . . . 18 because the gain does not change in those stations during operation.

The signal which is brought by the amplifier modules 32, 33 to the defined signal level (i.e., the order of magnitude of the transmission level) is fed via a discriminator 36 to an output 37 of the particular receiving amplifier 30. The received signal is then transmitted from the output 37 to additional modules (not shown) of the particular receiving station (i.e., the terminals 12 . . . 18 or the master station 11) for further processing.

Alternative methods exist for determining the specific gains of each of the receiving amplifiers 21. First, The measurement of the specific line attenuation of each section of the transmission line 20 in use can be carried out by means of a signal level transmitter and measuring set 38. the values so determined are then entered into the respective transmission system stations individually. In the embodiment of the invention shown in FIG. 2, the values can be so entered as inputs to the control inputs D0 . . . D3 and D4 . . . D7 of the first and second counters 34, 35 directly or via the control unit.

Secondly, a test message can be sent first by the master station 11, at a fixed time of the transmission procedure (HDLC), while the control unit in each of the terminals 12 . . . 18 increases the gain of its respective receiving amplifier 21 "slowly". When the test message is understood, i.e., the test message is processed without error in the additional modules connected to the receiving amplifier 21, this indicates that the correct gain of the particular terminal station has been found and can be stored. The gain in the master station 11 is determined in principle by the same method. A microcomputer (not shown) which is present in a control unit of the master station 11 can attempt to build up a connection utilizing the entire transmitter-receiver circuit and the transmission line 20. If this is not successful, it increases the gain of the receiving amplifier 21 in the master station 11 via the counters 34, 35 by one step and a new attempt begins. This is repeated until a connection is established. For an optimum signal-to-noise ratio, the gain thus found in each of the transmission stations can be further corrected by some fixed value.

The disclosed method of determining and setting the gains of the transmission stations proceeds automatically and requires no manual activity or manual intervention. Also, no additional amount of apparatus is required because only circuit parts already present in the terminal stations 12 . . . 18 and in the master station 11 are utilized.

It is to be understood that the embodiments described herein are merely illustrative of the principles of the invention. Various modifications may be made thereto by persons skilled in the art without departing from the spirit and scope of the invention.

What is claimed is:

1. A method of transmitting signals between a master station and a plurality of terminal stations connected at different points of a transmission line, in which a correction of the attenuation distortion caused by the transmission line is carried out in the receiving station, comprising the steps of:
   (a) transmitting a plurality of signals via the transmission line prior to the start of a desired transmission;
   (b) determining the respective gains of receiving amplifiers present in the master station and in each of the terminal stations from the corresponding transmissions of the plurality of signals so that a respective signal between stations can be set at a defined level to overcome the attenuation distortion of the particular section of the transmission line in use; and
   (c) storing and then setting the gains of the receiving amplifiers in the terminal stations and in the master station, in such a manner that the signal level attenuation of the section of the transmission line in use between the master station and each respective terminal station is compensated and the respective signal therebetween is set at the defined level.

2. The method as set forth in claim 1, wherein:
   the specific attenuation values are determined by means of a signal level transmitter and a signal level measuring device, and are stored in the master station and in the respective terminal stations.

3. The method as set forth in claim 1, wherein the transmitting step comprises
   transmitting a test signal, in a learning phase, from the master station to each one of the terminal stations; and
   the determining step comprises the steps of:
   (a) evaluating the corresponding output of the receiving amplifier in each of the terminal stations;

(b) detecting whether a signal level suitable for evaluation is present at the output of the receiving amplifier of a respective terminal station;
(c) repeatedly sending the test signal to a terminal station until a signal level suitable for evaluation is present at the output of the receiving amplifier of the respective terminal station; and
(d) simultaneously with each repetition, increasing the gain of the receiving amplifier of the respective terminal station by a fixed amount.

4. The method as set forth in claim 1 wherein the transmitting step comprises the steps of:
(a) attempting, by the master station, to establish a connection to each of the terminal stations in a learning phase; and
(b) sending a respective reply signal, by each terminal station, in response to the master station attempt to establish a connection therebetween; and
the determining step comprises the steps of:
(a) repeatedly attempting the establishment of each connection until a corresponding reply signal sufficient for evaluation is present at the output of the amplifier of the master station; and
(b) simultaneously with each repetition, increasing the gain of the receiving amplifier of the master station by a fixed amount.

5. The method as set forth in claim 3 wherein the transmitting step further comprises the steps of:
(a) attempting, by the master station, to establish a connection to each of the terminal stations in the learning phase; and
(b) sending a respective reply signal, by each terminal station, in response to the master station attempt to establish a connection therebetween; and
the determining step comprises the steps of:
(a) repeatedly attempting the establishment of each connection until a corresponding replay signal sufficient for evaluation is present at the output of the amplifier of the master station; and
(b) simultaneously with each repetition, increasing the gain of the receiving amplifier of the master station by a fixed amount.

6. The method as set forth in claim 3, further comprising the step of:
increasing the gain of the respective receiving amplifier, after a signal level sufficient for evaluation is reached, by a fixed amount for taking into consideration a sufficient signal-to-noise ratio.

7. The method as set forth in claim 4, further comprising the step of:
increasing the gain of the respective receiving amplifier, after a signal level sufficient for evaluation is reached, by a fixed amount for taking into consideration a sufficient signal-to-noise ratio.

8. The method as set forth in claim 5, further comprising the step of:
increasing the gain of the respective receiving amplifier, after a signal level sufficient for evaluation is reached, by a fixed amount for taking into consideration a sufficient signal-to-noise ratio.

9. Apparatus for transmitting signals between a master station and a plurality of terminal stations connected at different points of a transmission line, the master station and every one of the terminal stations each having a transmitting part which transmits a signal containing data messages with fixed structure and a receiving part which evaluates a respective transmitted signal and determines a respective gain therefrom so that a respective signal from the transmitting station can be set at a defined level to overcome the attenuation distortion of the particular section of the transmission line in use, comprising:
(a) an adaptive receiving amplifier, the gain of which can be set digitally, contained in each receiving part which receives the respective transmitted signal and transmits the received signal to the remainder of the receiving part for evaluation; and
(b) a memory module assigned to each amplifier, in which the respectively necessary gain for the evaluation of the transmitted signal from the particular transmitting station can be deposited such that the stored value determines the gain of the respective receiving amplifier.

* * * * *